(12) United States Patent
Kim et al.

(10) Patent No.: US 11,886,879 B2
(45) Date of Patent: Jan. 30, 2024

(54) PROCESSOR, PROCESSOR OPERATION METHOD AND ELECTRONIC DEVICE COMPRISING SAME FOR SELECTIVE INSTRUCTION EXECUTION BASED ON OPERAND ADDRESS

(71) Applicants: ICTK Holdings Co., Ltd., Seongnam-si (KR); IUCF-HYU(Industry-University Cooperation Foundation Hanyang University), Seoul (KR)

(72) Inventors: Dong Kyue Kim, Seoul (KR); Piljoo Choi, Busan (KR)

(73) Assignees: ICTK Holdings Co., Ltd., Busan (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 32 days.

(21) Appl. No.: 17/630,892

(22) PCT Filed: Aug. 6, 2020

(86) PCT No.: PCT/KR2020/010414
§ 371 (c)(1),
(2) Date: Jan. 27, 2022

(87) PCT Pub. No.: WO2021/025490
PCT Pub. Date: Feb. 11, 2021

(65) Prior Publication Data
US 2022/0283814 A1    Sep. 8, 2022

(30) Foreign Application Priority Data

Aug. 6, 2019  (KR) .................. 10-2019-0095684
Jan. 17, 2020  (KR) .................. 10-2020-0006817
Aug. 5, 2020  (KR) .................. 10-2020-0098056

(51) Int. Cl.
*G06F 9/30* (2018.01)
*G06F 9/54* (2006.01)
(Continued)

(52) U.S. Cl.
CPC ...... *G06F 9/30145* (2013.01); *G06F 9/30105* (2013.01); *G06F 9/544* (2013.01);
(Continued)

(58) Field of Classification Search
None
See application file for complete search history.

(56) References Cited

U.S. PATENT DOCUMENTS 7,631,166 B1    12/2009  Hildebrandt
8,819,399 B1 *   8/2014  Muth .................. G06F 21/51
                                              712/226
(Continued)

FOREIGN PATENT DOCUMENTS

KR    1020040101215    12/2004
KR    1020100082748    7/2010
(Continued)

OTHER PUBLICATIONS

Machine Translation of Japanese Patent Application JP-54095129-A, 1978. (Year: 1978).*
(Continued)

*Primary Examiner* — Steven G Snyder

(57) ABSTRACT

Disclosed are a processor, a processor operation method and an electronic device comprising same. The disclosed processor operation method comprises the steps of: identifying an instruction for instructing the execution of a first operation and address information of an operand corresponding to the instruction; and executing the instruction on the basis of whether or not the address information of the operand satisfies a predetermined condition. In the step of executing
(Continued)

the instruction, a second operation configured to the instruction is executed for the operand if the address information of the operand satisfies the predetermined condition, and the first operation is executed for the operand if the address information of the operand does not satisfy the predetermined condition.

18 Claims, 11 Drawing Sheets

(51) Int. Cl.
G06F 21/60 (2013.01)
G06F 21/72 (2013.01)
G06F 21/52 (2013.01)
G06F 12/14 (2006.01)

(52) U.S. Cl.
CPC .............. *G06F 12/14* (2013.01); *G06F 21/52* (2013.01); *G06F 21/602* (2013.01); *G06F 21/72* (2013.01)

(56) References Cited

U.S. PATENT DOCUMENTS

| | | | |
|---|---|---|---|
| 9,311,458 B2* | 4/2016 | Mangalampalli | G06F 21/60 |
| 9,514,083 B1* | 12/2016 | Arndt | G06F 13/4282 |
| 9,792,234 B2* | 10/2017 | Mangalampalli | G11B 20/0013 |
| 10,185,680 B2* | 1/2019 | Mangalampalli | G11B 20/0013 |
| 10,452,288 B2* | 10/2019 | Greiner | G06F 3/0685 |
| 11,106,464 B2* | 8/2021 | Venkataramani | G06F 9/30087 |
| 11,126,434 B2* | 9/2021 | Kobayashi | G06F 9/30189 |
| 11,681,529 B2* | 6/2023 | Venkataramani | G06N 3/045 |
| | | | 712/225 |
| 2015/0100767 A1* | 4/2015 | Topham | G06F 9/30181 |
| | | | 712/226 |
| 2016/0004647 A1* | 1/2016 | Eppensteiner | G06F 12/14 |
| | | | 710/110 |
| 2020/0125770 A1* | 4/2020 | LeMay | H04L 9/14 |
| 2020/0201789 A1* | 6/2020 | Durham | H04L 9/0631 |
| 2020/0310806 A1* | 10/2020 | Kobayashi | G06F 9/30145 |
| 2021/0149825 A1* | 5/2021 | Durham | G06F 12/1408 |
| 2021/0150040 A1* | 5/2021 | Durham | G06F 21/54 |
| 2022/0382885 A1* | 12/2022 | Durham | G06F 12/0646 |

FOREIGN PATENT DOCUMENTS

| | | |
|---|---|---|
| KR | 1020160046149 | 4/2016 |
| KR | 101867219 | 6/2018 |

OTHER PUBLICATIONS

P. Choi et al., "Architectural Supports for Block Ciphers in a RISC CPU Core by Instruction Overloading," IEEE Transactions on Computers, Jan. 2021, pp. 1-29.

* cited by examiner

| Overloaded instruction | Operator in code | Normal Operation for normal Operand (srcFlag = 0) | Extended Operation for registered Operand (srcFlag = 1) |
|---|---|---|---|
| shift | << | shift | rotation |
| multiply | * | integer multiplication | convolutions on four bytes |
| divide | / | integer division | SubBytes on four bytes |

FIG.5

| Macro | Definition using extended Operations | Definition using Operations (for debugging) |
|---|---|---|
| ROL(r, n) | (r << n) | ((r << b) \| (r >> (32-n))) |
| MLT(r, n) | (r * n) | convolutions(r, n >> 24) |
| INV(n, r) | (n / r) | n == 1 ? SBs(r) : invSBs(r) |
| LoadKey(rk, step) | (rk) | (step == 1 ? *rk++ : *rk--) |
| LoadRound(rnd) | (rnd) | (--rnd == 0) |

FIG.6

| Macro | Definition |
|---|---|
| RowCalc_SB(r) | INV(1, r) |
| RowCalc_SB_SR(r, n) | (ROL(INV(1, r), n) |
| RowCalc_MC(r0, r1, r2, r3) | (MLT(r0, 0x0211B000)^MLT(r1, 0x0311B000)^r2^r3) |

FIG.8

| Macro | Definition |
|---|---|
| SetTexts(v, n) | {*TEXT_ADDR = &v; *TEXT_NUM = n;} |
| SetRound(v, n) | {*RND_ADDR = &v; v =n} |
| SetKeyPointer(v, pnt, step) | {*KEY_ADDR = &v; v = pnt; *KEY_CONFIG = step;} |
| Release Vars() | {*TEXT_NUM = 0;} |

FIG.9

PROCESSOR, PROCESSOR OPERATION METHOD AND ELECTRONIC DEVICE COMPRISING SAME FOR SELECTIVE INSTRUCTION EXECUTION BASED ON OPERAND ADDRESS

TECHNICAL FIELD

The following description relates to a processor, a processor operation method, and an electronic device including the same.

BACKGROUND ART

Block cipher algorithms may be essential to provide basic security services such as confidentiality and integrity. These algorithms may be implemented in software or hardware. The former implementation may provide flexibility, while the latter may support high performance. In order to achieve these advantages together, extensive research on programmable processors for block ciphers is in progress.

The first method may be to use a programmable cryptographic coprocessor, such as CryptoManiac, Cryptonite, Cryptoraptor, or a coprocessors proposed by SPARX. These coprocessors execute block ciphers much faster with custom designs and parallel processing and are programmable with their own instruction set architecture (ISA). However, these coprocessors require additional hardware resources such as control logic gates, register files, instruction memory, and data memory, which may significantly increase cost.

The second method may be to extend an existing CPU core to support cryptographic operations. In general, the extension of the CPU core for block ciphers has been achieved by extending the ISA. The ISA extension was first proposed in the idea that the CPU core additionally provides instructions dedicated to multiple cryptographic algorithms. However, most of the algorithms supported are outdated and may be of little use today. The CPU core may provide instructions to perform SubBytes and MixColumns transformations of AES. Xilinx's commercial core, CryptoBlaze processor, is an 8-bit microcontroller core that may support inversion and convolution of AES and RSA operations (for example, Galois fields (GFs)).

DISCLOSURE OF THE INVENTION

Technical Solutions

A processor operation method according to an example embodiment includes identifying an instruction for instructing execution of a first operation and address information of an operand corresponding to the instruction; and executing the instruction based on whether or not the address information of the operand satisfies a predetermined condition, wherein the executing of the instruction includes executing a second operation set for the instruction on the operand if the address information of the operand satisfies the predetermined condition, and executing the first operation on the operand if the address information of the operand does not satisfy the predetermined condition.

In the processor operation method according to an example embodiment, the predetermined condition may correspond to whether or not the address information of the operand falls within a preset address range.

In the processor operation method according to an example embodiment, the first operation may be an operation that is executed less than the second operation in the processor.

In the processor operation method according to an example embodiment, an address range according to the predetermined condition may be pre-registered with the processor before the instruction is executed.

In the processor operation method according to an example embodiment, the second operation may be an operation not included in an instruction set architecture (ISA) of the processor.

In the processor operation method according to an example embodiment, the operand may be loaded from a memory connected to the processor and stored in a dedicated buffer in the processor, and the address information of the operand may indicate an address in the dedicated buffer in which the operand is stored.

In the processor operation method according to an example embodiment, if the address information of the operand satisfies the predetermined condition, the operand may be stored in a data-buffer in the processor and the address information of the operand may be stored in the configuration-buffer in the processor.

In the processor operation method according an example embodiment, the configuration-buffer may be a memory mapped buffer.

In the processor operation method according to an example embodiment, whether or not the address information of the operand satisfies the predetermined condition may be expressed by flag information connected to a general-purpose register in the processor.

In the processor operation method according to an example embodiment, if the address information of the operand satisfies the predetermined condition, a round counter and a round-key pointer used in an operation of the processor may be stored in a data-buffer in the processor and address information of the round counter and address information of the round-key pointer may be stored in a configuration-buffer in the processor.

A processor according to an example embodiment includes a data-buffer configured to store an operand; a configuration-buffer configured to store address information of the operand; and a processing unit configured to identify an instruction for instructing execution of a first operation and address information of the operand corresponding to the instruction, and execute the instruction based on whether or not the address information of the operand satisfies a predetermined condition, wherein the processing unit is configured to execute a second operation set for the instruction on the operand if the address information of the operand satisfies the predetermined condition and to execute the first operation on the operand if the address information of the operand does not satisfy the predetermined condition.

In the processor according to an example embodiment, the predetermined condition may correspond to whether or not the address information of the operand falls within a preset address range.

In the processor according to an example embodiment, the first operation may be an operation that is executed less than the second operation in the processor.

In the processor according to an example embodiment, an address range according to the predetermined condition may be pre-registered with the processor before the instruction is executed.

In the processor according to an example embodiment, the second operation may be an operation not included in an ISA of the processor.

In the processor according to an example embodiment, the operand may be loaded from a memory connected to the processor and stored in a dedicated buffer in the processor, and the address information of the operand may indicate an address in the dedicated buffer in which the operand is stored.

In the processor according to an example embodiment, if the address information of the operand satisfies the predetermined condition, the operand may be stored in a data-buffer in the processor and the address information of the operand may be stored in a configuration-buffer in the processor.

The processor according to an example embodiment may further include a dedicated operator configured to perform the second operation.

An electronic device according to an example embodiment includes a memory configured to store an instruction and an operand corresponding to the instruction; and a processor configured to execute the instruction, wherein the processor includes a buffer configured to store the operand and address information of the operand received from the memory to execute the instruction; and a processing unit configured to identify the instruction for instructing execution of a first operation and the address information of the operand corresponding to the instruction, and execute the instruction based on whether or not the address information of the operand satisfies a predetermined condition, and wherein the processing unit is configured to execute a second operation set for the instruction on the operand if the address information of the operand satisfies the predetermined condition, and execute the first operation on the operand if the address information of the operand does not satisfy the predetermined condition.

Advantageous Effects

According to an example embodiment, by differently interpreting the same instruction according to data address and performing different operations accordingly, it is possible to effectively support a new operation without changing the ISA or compiler of the existing CPU core. Therefore, an encryption method developed after CPU distribution may be implemented efficiently and safely. As the new operation is performed on an operator dedicated to the operation in the CPU core, fast operation may be expected.

According to one example embodiment, by adding a dedicated cipher buffer for block ciphers to the CPU core, it is possible to significantly reduce memory access of load and store, which occupies a large part in a program. By executing an existing operation or a newly defined cryptographic operation depending on whether the operand is loaded from a dedicated cryptographic buffer, fewer lines of code and memory access, fast computation, and flexibility may be achieved and complex cryptographic operations may be accelerated without modifying the existing ISA and compiler framework.

According to one example embodiment, arithmetic operations may be executed faster than accesses to tables stored in a memory, and transformations may be expressed more simply in overloaded arithmetic instructions. As a result, compared to legacy AES software codes, new AES codes with instruction overloading may achieve faster execution speed and a smaller memory footprint.

According to an example embodiment, an overhead of memory loading may be effectively reduced by using an additional buffer. Through expansion of the ALU operation and redefinition of the operation, it is possible to improve the speed of block ciphers and provide flexibility to support operation of various block cipher algorithms. Power analysis resistivity may be improved through automatic masking.

According to an example embodiment, by applying a masking technology to the hardware internal CPU core, data in the dedicated cryptographic buffer may be automatically masked, and the operation may be executed with the masked value. In other words, even a code developed without considering the power analysis resistivity may be effectively protected from power analysis attacks under the same processing speed.

BRIEF DESCRIPTION OF DRAWINGS

FIG. 5 is a diagram illustrating an example of arithmetic instruction overloading according to an example embodiment.

FIG. 6 is a diagram illustrating an example of C expressions for an overloaded instruction according to an example embodiment.

FIG. 8 is a diagram illustrating an example of macros for AES transformations using an overloaded instruction according to an example embodiment.

FIG. 9 is a diagram illustrating an example of variable registration and releasing according to an example embodiment.

BEST MODE FOR CARRYING OUT THE INVENTION

Figure 1:
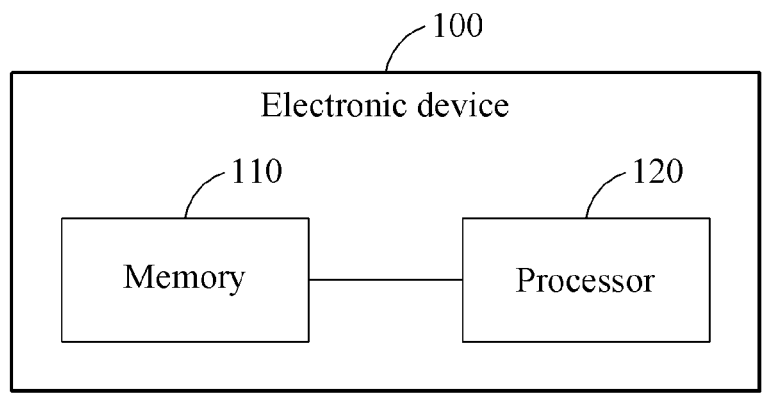
FIG. 1 is a diagram illustrating an electronic device according to an example embodiment.

Hereinafter, example embodiments will be described in detail with reference to the accompanying drawings. However, since various changes may be made to the example embodiments, the scope of the patent application is not limited or confined by these example embodiments. It should be understood that all changes, equivalents, and substitutes for the example embodiments are included in the scope of rights.

The terms used in the example embodiments are used merely for the purpose of description, and should not be construed as limiting. A singular expression includes a plural expression unless the context clearly dictates otherwise. In this specification, it should be understood that terms such as "comprise", "include", or "have" are intended to designate that a feature, number, step, operation, component, part, or a combination thereof described in the specification exists, but do not preclude the possibility of existence or addition of one or more other features, numbers, steps, operations, components, parts, or combinations thereof.

Unless otherwise defined, all terms used herein, including technical or scientific terms, have the same meaning as commonly understood by a person skilled in the art to which the example embodiment pertains. Terms such as those defined in dictionaries commonly used should be construed as having meanings consistent with the meanings in the context of the related art, and are not construed in ideal or excessively formal meanings unless explicitly defined in the present application.

In addition, in the description with reference to the accompanying drawings, the same elements are given the same reference numeral regardless of numerals in the drawings, and overlapping description thereof will be omitted. In describing the example embodiments, in the case that it is determined that detailed descriptions of a related known art may unnecessarily obscure the gist of the example embodiments, the detailed descriptions thereof will be omitted.

Further, in describing elements of the example embodiments, terms such as first, second, A, B, (a), (b), and the like may be used. These terms are merely for distinguishing the elements from other elements, and the essence, order, or order of the elements are not limited by the terms. In the case that it is described that an element is "coupled", "linked", or "connected" to another element, it should be understood that the element may be directly coupled or connected to the other element, but another element may be "coupled", "linked", or "connected" between the elements.

An element included in one example embodiment and an element having a common function will be described using the same name in other example embodiments. Unless otherwise stated, explanations described in one example embodiment may be applied to other example embodiments, and detailed descriptions within the overlapping range will be omitted.

FIG. 1 is a diagram illustrating an electronic device according to an example embodiment.

Referring to FIG. 1, an electronic device 100 according to an example embodiment includes a memory 110 and a processor 120. In an example embodiment, the electronic device 100 may include various computing devices such as smart phones, tablets, laptops, and personal computers, various wearable devices such as smart watches and smart glasses, various home appliances such as smart speakers, smart TVs, and smart refrigerators, smart cars, smart kiosks, Internet of Things (IoT) devices, drones, and robots.

The memory 110 stores an instruction to be executed by the processor 120 and an operand corresponding to the instruction. For example, the memory 110 may be a volatile memory or a non-volatile memory.

The processor 120 is a device that executes instructions or programs, or controls the electronic device 100, and may be, for example, a central processing unit (CPU), a graphic processing unit (GPU), or a neural processing unit (NPU). The processor 120 may read the instruction and/or operand stored in the memory 110 and store it in an internal buffer, and may quickly perform an operation according to the instruction based on data stored in the internal buffer. As such, the instructions executable by the processor 120 are defined by an instruction set architecture (ISA), and in various cases, the processor 120 may execute a new instruction not defined in the ISA. If new instructions are added to the ISA for this purpose, ISA extensions and compiler changes may be required. To prevent this, instead of adding the new instructions to the ISA, only the execution of existing instructions may be extended. In other words, the processor 120 may execute different operations for the same instructions according to a data address of the operand. This new computer architecture concept may be referred to herein as instruction overloading. Hereinafter, detailed descriptions will be provided with reference to the drawings.

Figure 2:
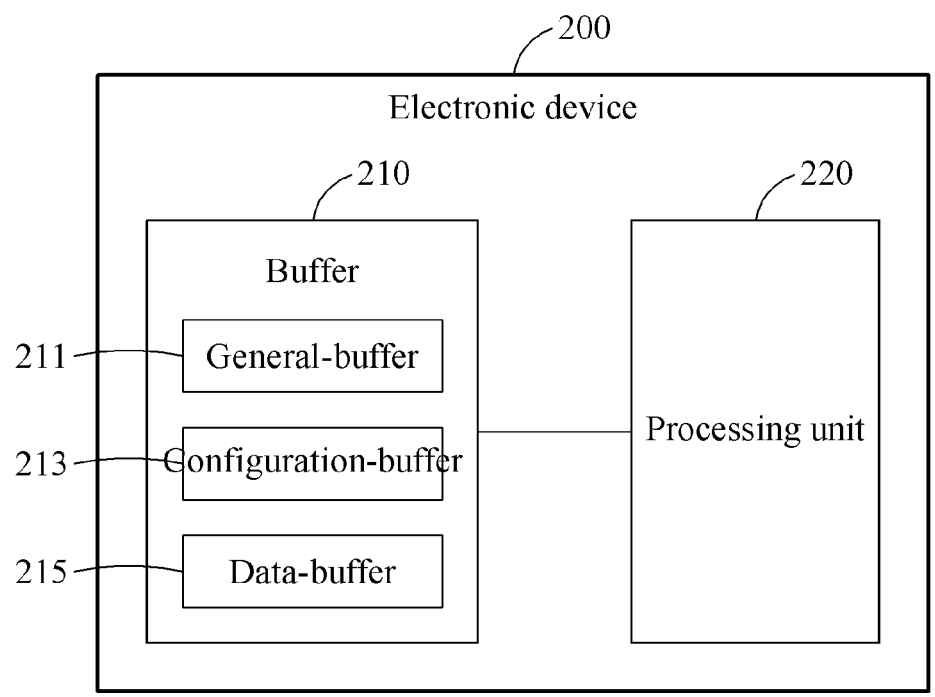
FIG. 2 is a diagram illustrating a processor according to an example embodiment.

FIG. 2 is a diagram illustrating a processor according to an example embodiment.

Referring to FIG. 2, a processor 200 includes a buffer 210 and a processing unit 220. The buffer 210 may include a general-buffer 211, a configuration-buffer 213, and a data-buffer 215. Here, the general-buffer 211 may be a general-purpose register (GPR) generally included in the processor 200, and the configuration-buffer 213 and the data-buffer 215 may be dedicated buffers for instruction overloading described above. The buffer 210 will be described in detail with reference to FIG. 4. The processing unit 220 is a device that performs an operation according to an instruction, and may include, for example, a reduced instruction set computer-V (RISC-V) core. The processing unit 220 may also be referred to as a processing core. The processing unit 220 will be described in detail with reference to FIG. 3.

In an example embodiment, among the operations performed by the processor 200, there may be a frequently used operation and an infrequent operation. For example, when block ciphers are performed in the processor 200, some operations such as multiplication (*) and division (/) are rarely used, while counterparts for finite fields, such as convolution and multiplicative inversion, are frequently used but may not be defined in the ISA corresponding to the processor 200. In this case, a new operation may be supported by the processor 200 without changing the ISA of the existing processor 200 by interpreting an instruction for instructing execution of the operation that is not frequently used, such as multiplication (*) or division (/), depending on the situation. Such instruction overloading may be distinguished from operator overloading in which an operator is interpreted as a different operation according to the data type of the operand in object-oriented languages.

The processor 200 may execute different operations for the same instruction according to address information of the operand. The address of such a variable may be registered in advance with the processor 200 and a variable to be processed differently may be designated. In other words, the execution of the instruction in the processor 200 may be different depending on whether or not the address of the operand is registered.

In one example embodiment, three different approaches for RISC-V core extension using instruction overloading may be used.

The first approach may be to extend the core to support a specific block cipher. For example, an advanced encryption standard (AES) extension may be performed. To this end, two types of instructions may be overloaded: a load/store instruction and an arithmetic instruction. These instructions may provide the following functions for the registered variables.

Execution of a series of routine operations by a single overloaded load instruction Management of variables within the CPU core Cryptographic operation and transformation First, each routine operation on some variable, such as a round counter and a round-key pointer, may be treated as the single overloaded load instruction, which may reduce instruction count.

Second, the registered variable may be managed in a dedicated buffer (for example, the configuration-buffer 213 and the data-buffer 215) within the processor 200, and the registered variable may be loaded and stored as the overloaded load and store instruction. Through this, an access speed to a block cipher variable may be improved.

Third, an overloaded arithmetic instruction may support the cryptographic operations and transformations, which may not be easily processed only with instructions generally provided by the processor 200. The transformation may usually be handled using large pre-computed tables in legacy software. However, an overloaded arithmetic operation may have faster execution time than accessing tables stored in a memory, and the transformation may be expressed more simply with the overloaded arithmetic instruction. As a result, compared to a legacy AES software code, a new AES code with instruction overloading may achieve faster execution speed and a smaller memory footprint. This AES extension may also be applied to XOR-based (ARX-based) block cipher addition/AND such as SIMON. SIMON, a lightweight block cipher, has almost the same memory footprint, but instruction overloading may be effective in reducing the execution time of SIMON code.

The second approach to the RISC-V core extension may be to provide general cryptographic operations and support block ciphers that perform operations through $GF(2^8)$ such as convolution and multiplicative inversion. This may mean that, if necessary, various block ciphers including ciphers developed after distribution of the processor 200 may be effectively supported with less overhead compared to the first method.

In the third approach, hardware masking may additionally be applied to the second approach. Here, masking is one of widely used measures against power analysis attacks. This will be described in detail with reference to FIG. 10.

Figure 3:
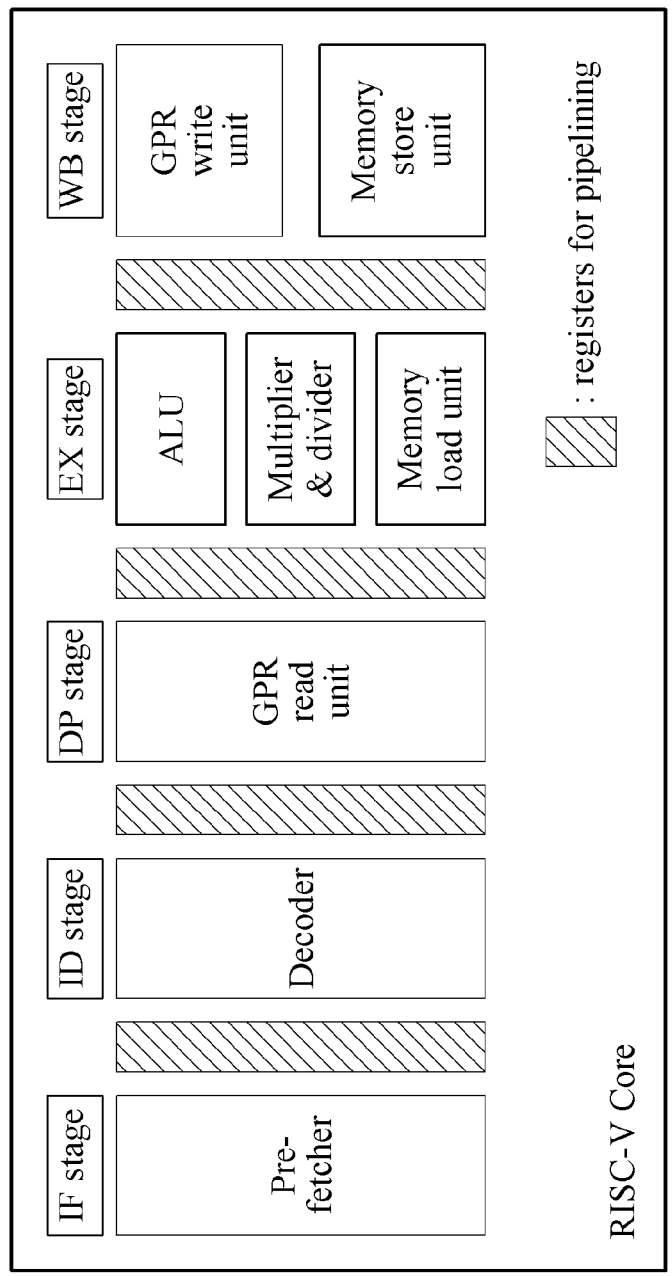
FIG. 3 is a diagram for explaining an RISC-V core according to an example embodiment.

FIG. 3 is a diagram for explaining a RISC-V core according to an example embodiment.

Referring to FIG. 3, an operation of the RISC-V core according to the example embodiment may be divided into an instruction fetch (IF) stage, an instruction decode (ID) stage, a DP stage, an execute (EX) stage, and a writeback (WB) stage. RISC-V may be used when designing a processor with instruction overloading applied. RISC-V may be an open source ISA based on RISC principles. For a wide range of applications, supporting small embedded systems, personal computers, and supercomputers, both high performance and low power consumption may be considered.

Based on RISC-V RV32IM ISA, a custom CPU core may be designed that processes 32-bit integer-based instructions for integer multiplication and division (M extension). Specifically, a microarchitecture of a base core supports single-issue, out-of-order execution, and AXI4-Lite interface, and the M extension may include a 32-bit×8-bit multiplier and a 32-bit x 1-bit divider.

The gray areas between stages in a 5-stage base core shown in FIG. 3 show newly proposed parts for proposed instruction overloading. Arithmetic instruction overloading may require modification of an arithmetic logic unit (ALU), a multiplier, and a divider, and load/store instruction overloading may require modification of memory load and storage devices. In FIG. 3, some elements such as a jump-and-branch unit and a re-order unit may be omitted.

Figure 4:
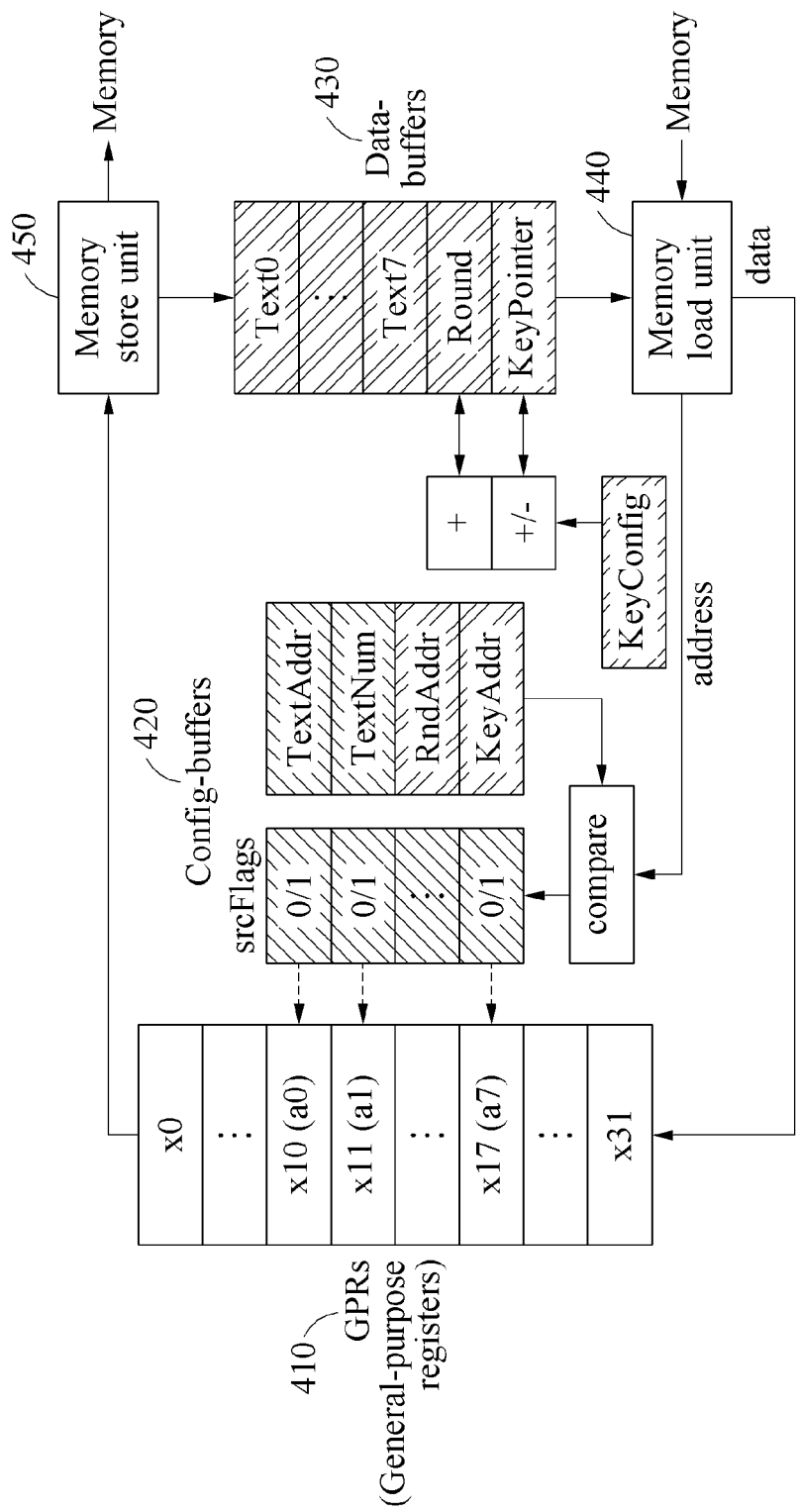
FIG. 4 is a diagram for explaining buffers in a processor according to an example embodiment.

FIG. 4 is a diagram for explaining buffers in a processor according to an example embodiment.

Referring to FIG. 4, a GPR 410, configuration-buffers 420, and data-buffers 430 included in the processor according to the example embodiment are illustrated. The configuration-buffers 420 may include srcFlags, TextAddr, TextNum, RndAddr, and KeyAddr. The data-buffers 430 may include Text0-Text7, Round, KeyPointer, and KeyConfig. Although described in detail later, srcFlags, TextAddr, and TextNum may be used for arithmetic instruction overloading, and RndAddr, KeyAddr, Text0-Text7, Round, KeyPointer, and KeyConfig may be used for load/store instruction overloading. A memory load unit 440 may be a device for loading instructions and/or operands stored in a memory, and a memory storage unit 450 may be a device for storing data of the GPR 410 in a memory and/or the data-buffers 430.

Arithmetic Instruction Overloading

Arithmetic operations such as integer multiplication (*) and integer division (/) may be rarely used in block ciphers. Therefore, instructions for these operations may be assigned to cryptographic transformations and operations such as SubByte and convolution of advanced encryption standard (AES). Also, shift instructions (for example, << and >>) may be assigned to rotations, which may be used more frequently than shift operations in block ciphers. Therefore, by overloading the instructions corresponding to the operators *, /, <<, and >>, it is possible to provide expansion operations for the registered variables.

For variable registration, the processor may include the Config-Buffers including TextAddr, TextNum, and srcFlags shown in FIG. 4. TextAddr may store a start address of an intermediate value variable to be registered, and TextNum may store the number of intermediate value variables. For example, each of TextAddr and TextNum may have 4-bit.

srcFlags may be linked to a0-a7 (in other words, x10-x17) in the GPR 410 for storing function arguments or internal variables in the RISC-V core. In the case that an address of loaded data falls within address ranges of TextAddr and TextNum, each flag may be set to 1. In other words, if the data address in which the operand is stored falls within the range [TextAddr, TextAddr+TextNum], when the operand is loaded into the GPR 410, the flag(s) corresponding to one or more of a0-a7 in which the data is stored may be set to 1 in srcFlags. For example, srcFlags may have 1-bit×8.

FIG. 5 is a diagram illustrating an example of arithmetic instruction overloading according to an example embodiment.

Referring to FIG. 5, an example in which execution of shift (<<), multiplication (*), and division (/) instructions is expanded to support AES is shown. Since a right rotation may be expressed as a left rotation, right shift (>>) may not be separately expanded. In the case that the operand is loaded from the registered variable (for example, [TextAddr, TextAddr+TextNum] address range), in other words, if the srcFlag bit of the operand is 1, the expansion operation may be executed as follows.

First, the shift instruction may be interpreted as the rotation. Thus, a word may be rotated using the symbol <<.

Then, the multiplication instruction may be interpreted as a parallel convolution over 4-bytes in a selected word. A corresponding C expression is:

$$w * 0xA_1A_01B_1B_0000 \qquad \text{[Formula 1]}$$

Here, w may be a word from a registered variable, $0xA_1A_0$ may be a polynomial to multiply by each byte in w, and $0x1B_1B_0$ may be a reduction polynomial for $GF(2^8)$. In other words, if the 4 bytes in w are expressed as $b_0$, $b_1$, $w_2$, and $b_3$, Formula 1 may mean $$b_i \leftarrow b_i \times 0xA_1A_0 \bmod 0x1B_1B_0 (i=0,\ldots,3).$$

Finally, the overloaded instruction may be division. If the division instruction is used, SubBytes or Inverse SubBytes may be simultaneously performed on the 4-bytes of the selected word. A corresponding C expression is:

$$\pm 1/w \qquad \text{[Formula 2]}$$

Here, a negative sign may indicate inverse SubBytes for decoding.

Returning to FIG. 4, load/store instruction overloading is described in detail.

Load/Store Instruction Overloading

As described above, block ciphers may generally use the round counter, the round-key pointer, and the intermediate value variables. Operations on these variables may also be generic. Load/store instruction overloading on these variables may improve performance in two ways.

First, by using a dedicated buffer, the values of common block cipher variables may be accessed faster. If data of a running program is in memory, memory access may be very slow. In the case that a base RISC-V core has no memory latency, one or two clock cycles may be required for one load instruction. However, depending on the system configuration, the number of cycles may increase to several tens of cycles. By adding a dedicated buffer for block cipher variables, this issue may be solved. The buffer may be used as a means for faster access with the help of the proposed instruction overloading. Here, the dedicated buffer may be referred to as a data-buffer.

As described above, the address of the intermediate value variable is registered using TextAddr and TextNum, and this value may be used to set srcFlags for the overloaded arithmetic instructions. These two Config-Buffers (i.e. TextAddr and TextNum) may also be used for the overloaded load and store instructions to load the intermediate value variables from Text0-Text7, which are data-buffers for the intermediate value variables or store the intermediate value variables in Text0-Text7. Other block cipher variables, such as the round counter and the round-key pointer, may reside in the data-buffers such as Round and KeyPointer, respectively, and their addresses may be registered in additional Config-Buffers such as RndAddr and KeyAddr, respectively. The data-buffers may provide fast data access independent of memory latency. In other words, accessing each data-buffer may always require only one clock cycle. Other methods using cache and register keywords may also provide faster data access, but these methods may not guarantee fast and consistent data access because not all desired variables always reside in the GPR or cache.

In one example embodiment, RndAddr may store an address in which the round counter variable is stored, and KeyAddr may store an address in which the round-key pointer is stored. For example, each of RndAddr and KeyAddr may have 4-bits. Also, Text0-Text7 may store the intermediate value variables (for example, operands, etc.), and may each have, for example, 32-bits. Round may store the round counter, KeyPointer may store the round-key pointer, and KeyConfig may store an increment of KeyPointer (for example, 0, 1, −1, etc.). For example, Round may have 8-bit, KeyPointer may have 32-bit, and KeyConFigure may have 2-bit.

Second, routine operations such as increment, decrement, and comparison may be executed automatically whenever data in the data-buffer is loaded. Specifically, when the round counter is read, its value is automatically decremented, and a result of comparing the updated round counter with 0 may be returned. When the round-key pointer is read, a specified value is returned instead of the pointer value, so that the number of load instructions may be reduced by one. At the same time, the pointer may be incremented and decremented for encryption and decryption, respectively. A flag indicating increment or decrement of the round-key pointer may be stored in an additional buffer, KeyConfig. When the overloaded load instruction is executed, the data-buffers such as Round and KeyPointer may be used for the routine operations as well as fast data access.

FIG. 6 is a diagram illustrating an example of C expressions for an overloaded instruction according to an example embodiment.

AES Code Using Instruction Overloading

In AES, a 16-byte intermediate value including an input plain text may be treated as a (4×4)-byte array called state. Assume that $b_i$ is the ith byte of each intermediate value. Then the state may correspond to $b_i$ ($0 \le i \le 16$).

Each round of AES may include transformations such as AddRoundKey, SubBytes, ShiftRows, and MixColumns. AddRoundKey is a simple XOR with a round key, the remaining three transformations are:

SubBytes (SBs): SubByte($b_i$) may perform nonlinear substitutions for each byte $b_i$. This nonlinear operation is generally defined as multiplicative inversion, and may be followed by matrix multiplication with a predefined vector and affine transformation using XOR ($\oplus$). However, matrix multiplication may be expressed as a convolution using the reduced polynomial 0x101. Consequently, $b_i' = \text{SubByte}(b_i)$ may be as follows.

$$b_i' \leftarrow ((b_i^{-1} \bmod 0x11B) * 0x1F \bmod 0x101) \oplus 0x63 \quad \text{[Formula 3]}$$

ShiftRows (SRs): ShiftRow($r_j$) may rotate each row $r_j$ left by j bytes.

MixColumns (MCs): MixColumn(cj) may mix $c_j$ columns. Each byte of MixColumn($c_j$) may be defined as follows.

$$y_i(x_i * 0x02) \oplus (x_{i+1 \bmod 4} * 0x03) \oplus x_{i+2 \bmod 4} \oplus x_{i+3 \bmod 4} (0 \le i < 4), \quad \text{[Formula 4]}$$

Here, $x_i$ and $y_i$ ($0 \le i < 4$) are the i-th byte of the input and output columns, respectively, and * may represent convolution using the polynomial 0x11B.

In summary, AES transforms may require $GF(2^8)$, XOR, and convolutional and multiplicative inversions for rotation. Of these operations, only XOR is supported by a single instruction on a typical processor, while other operations may require multiple instructions. In particular, convolution and multiplicative inversion may be complex to compute, and may be byte-wise operations rather than word-wise operations. By applying instruction overloading to the AES code, these issues may be effectively overcome.

Referring to FIG. 6, an example of macros for extended operations of an overloaded instruction according to an example embodiment is shown. Macros may be defined as C expressions. Debugging may be supported by defining these macros rather than directly using extension operations such as *, /, and <<. The definitions in the last column of FIG. 6 may be used for debugging using normal operations without instruction overloading. The functions SB, invSB, and convolution may perform SubBytes, inverse SubBytes, and convolution on 4-bytes in a selected word, respectively. The macros ROL, MLT, and INV of FIG. 6 may be converted into shift, multiplication, and division instructions, respectively, at compile time. However, the processor may execute these instructions as rotation, convolution, and subBytes, respectively, in the case that the operands are loaded from the data-buffer.

Figure 7:
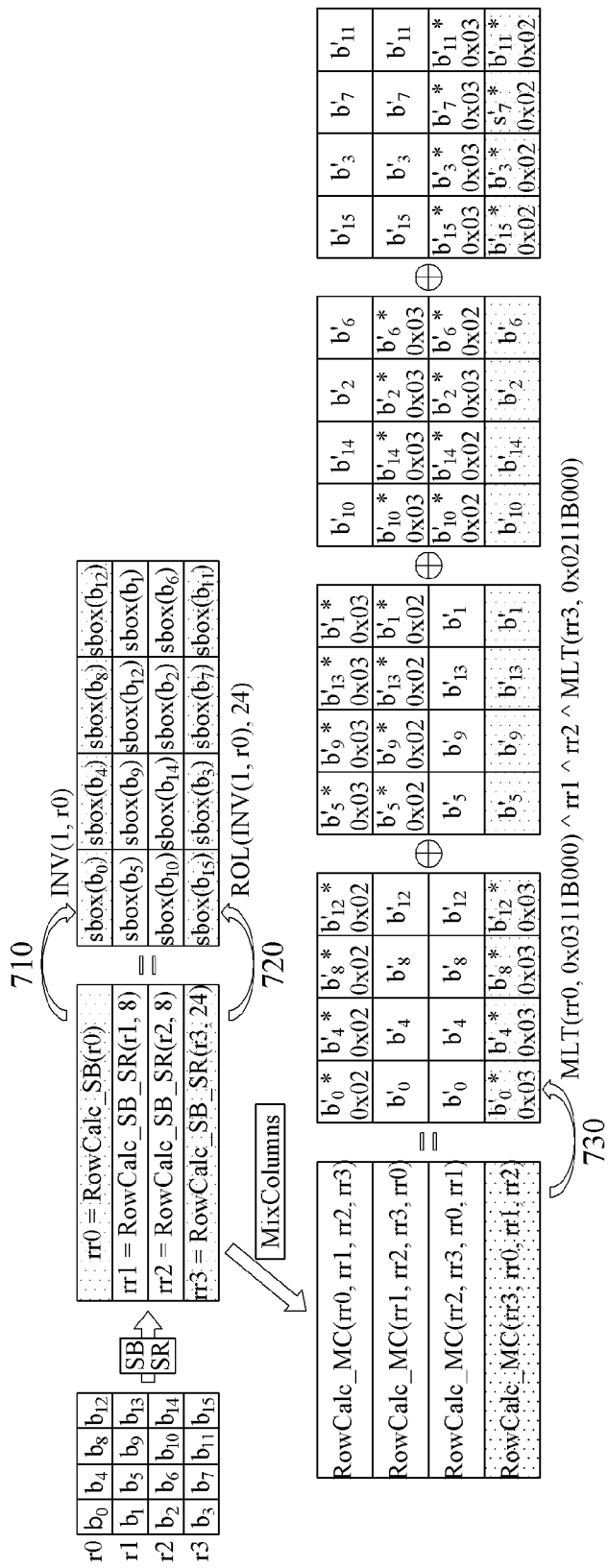
FIG. 7 is a diagram illustrating an example of transformations in an AES code through instruction overloading using macros according to an example embodiment.

FIG. 7 is a diagram illustrating an example of transformations in an AES code through instruction overloading using macros according to an example embodiment.

Referring to FIG. 7, RowCalcSB 710, RowCalcSBSR 720, and RowCalcMC 730 are illustrated as examples of performing transformations in the AES code by instruction overloading using the macros according to the example embodiment.

The AES encryption code using the macros described above may be as follows.

| | C expression |
|---|---|
| 1: | u32 rnd, *rk, r0, r1, r2, r3, rr0, rr1, rr2, rr3; |
| 2: | SetTexts(r0, 8); |
| 3: | SetRound(rnd, key->rounds); |
| 4: | SetKeyPointer(rk, key->rd_key, 1);  // 1: Encryption, -1: Decryption |
| | // round 0 |
| 5: | r0 = BytesToRow(in);     r0 ^= LoadKey(rk, 1); |
| 6: | r1 = BytesToRow(in + 1); r1 ^= LoadKey(rk, 1); |
| 7: | r1 = BytesToRow(in + 2); r2 ^= LoadKey(rk, 1); |
| 8: | r3 = BytesToRow(in + 3); r3 ^= LoadKey(rk, 1); |
| 9: | while(1){ // round 1, ..., round Nr |
| 10: | rr0 = RowCalc_SB(r0); // SBs on 1st row |
| 11: | rr1 = RowCalc_SB_SR(r1, 8); // SBs & SRs on 2nd row |
| 12: | rr2 = RowCalc_SB_SR(r2,16); // SBs & SRs on 3rd row |
| 13: | rr3 = RowCalc_SB_SR(r3,24); // SBs & SRs on 4th row |
| 14: | if(LoadRound(rnd)) break; |
| | // MixColunm on i-th row & addRoundKey with rk[i] |
| 15: | r0 = RowCalc_MC(rr0, rr1, rr2, rr3) ^ LoadKey(rk, 1); |
| 16: | r1 = RowCalc_MC(rr1, rr2, rr3, rr0) ^ LoadKey(rk, 1); |
| 17: | r2 = RowCalc_MC(rr2, rr3, rr0, rr1) ^ LoadKey(rk, 1); |
| 18: | r3 = RowCalc_MC(rr3, rr0, rr1, rr2) ^ LoadKey(rk, 1); |
| 19: | } |
| | // round Nr's addRoundKey |
| 20: | rr0 ^= LoadKey(rk, 1); RowToBytes(out, rr0); |
| 21: | rr1 ^= LoadKey(rk, 1); RowToBytes(out+1, rr1); |
| 22: | rr2 ^= LoadKey(rk, 1); RowToBytes(out+2, rr2); |
| 23: | rr3 ^= LoadKey(rk, 1); RowToBytes(out+3, rr3); |
| 24: | ReleaseVars( ); |

This code has three advantages. First, no precomputed table may be needed, while maintaining encryption speed. In lines 10 to 18 of the above code, column-wise macros such as ColumnCalc and ColumnCalcLast may be changed to row-wise macros such as RowCalcSB, RowCalcSBSR, and RowCalcMC.

These macros may be defined as ROL, MLT, and INV as shown in FIG. 8 to be described below, and may be applied to each row of the state as shown in FIG. 7. A row-wise arrangement may be considered instead of a column-wise arrangement. Through this, the advantage of the expansion operation may be fully utilized. For example, 3 ROL operations may complete ShiftRows in one round. Further, RowCalcMC 730 may indicate that 4 bytes of a row are multiplied by the same operand using one MLT operation.

FIG. 8 is a diagram illustrating an example of macros for AES transformations using an overloaded instruction according to an example embodiment.

Referring to FIG. 8, an example of macros for AES transformations using the overloaded instruction according to the example embodiment is shown. AES transformations may be performed quickly through extension operations such as ROL, MLT, and INV without memory access to precomputed tables. If the transformations are separated, each iteration of a while loop may correspond to one round.

Second, the C expression related to the round counter and round-key pointer may be simplified. In lines 5-8, 15-18, and 20-23 of the above AES encryption code, the macro LoadKey may indicate only a load pointer rk in the C expression. However, the processor may actually load the round key pointed to by rk and increment or decrement rk as shown in FIG. 6. In line 14, the macro LoadRound may indicate only load rnd in the C expression. However, the processor may actually load rnd and decrement rnd by 1, and return 1 if rnd=0.

Third, access to block cipher variables may be faster due to the data-buffer. Although this does not appear in the C expression, block cipher variables such as rnd, rk, r0-r3, and rr0-rr3 may reside in the data buffers instead of in a memory.

This may provide fast and constant access speed to the block cipher variables regardless of memory configuration.

FIG. 9 is a diagram illustrating an example of variable registration and releasing according to an example embodiment.

Referring to FIG. 9, an example of macros for variable registration and distribution according to the example embodiment is shown.

To use the overloaded instruction, the address of the block cipher variable should be registered in the configuration-buffers in advance. The configuration-buffers may be memory mapped buffers. Thus, the configuration-buffers may be accessed with predefined pointers such as TEXTADDR, TEXTNUM, RNDADDR, KEYADDR, and KEYCONFIG. The pointers may be defined as a volatile pointer type. For example, TEXTADDR may be defined as define TEXTADDR (volatile u32*) 0x10000000.

This method may generally be used to control peripherals of a device driver or to configure a processor. For example, it is possible to access control and state registration of the RISC-V core and a system control block of an ARM core to read state and change configuration. A similar approach may be used. Macros using the five pointers mentioned above to register and release variables may be shown in FIG. 9. Using the macro SetText, the start address and number of intermediate value variables such as r0-r3 and rr0-rr3 of the above AES encryption code may be recorded in TextAddr and TextNum. These may be pointed to by TEXTADDR and TEXTNUM, respectively. Similarly, the macros SetRound and SetKeyPointer may be used to register the addresses of the round counter and the round-key pointer in RndAddr and KeyAddr to which RND_ADDR and KEY_ADDR respectively point. In addition, the round-key pointer may be automatically incremented or decremented whenever it is loaded, and the macro SetKeyPointer may include writing a flag indicating increment or decrement in KeyConfig pointed to by KEY_CONFIG. After registration, loading and saving of the registered variables may only occur in the data buffers in the processor instead of in a memory until these variables are released using the macro ReleaseAddr. The definition of these macros only resets TEXTNUM to 0, but the processor may actually release all registered variables.

Instruction Overloading for Multiple Block Ciphers

Some modern block ciphers, such as SM4, SEED, and ARIA, may be designed using operations above $GF(2^8)$. Main common operations of these ciphers may be convolution and multiplicative inversion. However, a reduced polynomial may be different for each cipher. Therefore, in order to support various block ciphers, multiplicative inversion having an arbitrary reduction polynomial is required. This feature may be particularly useful for flexible S-box implementations. As such, instruction overload may be applied to support a wider range of block ciphers defined in $GF(2^8)$.

The extension of the division (/) instruction may be redefined so that multiplicative inversion may be performed when the srcFlag bit of the operand is 1.

The corresponding C expression for multiplicative inversion is as follows.

$$0x1A_1A_0/w \quad \text{[Formula 5]}$$

Here, $0x1A_1A_0$ may be a reduced polynomial for $GF(2^8)$. In other words, if 4 bytes in w are expressed as $b_0$, $b_1$, $b_2$, and $b_3$, Formula 5 may mean $b_i \leftarrow b_i^{-1}$ mod $0x1A_1A_0$ (i=0, ..., 3) for nonzero $b_i$. zero $b_i$ may be mapped to itself.

Hardware logic gates for these operations may require three clock cycles for the reduced polynomial for binary inversion and calculation.

In the case of the redefined division instruction, the definition of the macro INV for debugging of FIG. 6 may have to be changed to multiplicative inversion using the reduced polynomial n regardless of encryption or decryption. Combining the convolution of Equation 1 and the multiplicative inversion of Equation 5, RowCalcSB(r) in FIG. 8 may be redefined as (((0x11B/r)*A)^C), where A=0x1F101000 and C=0x63636363. This may be equivalent to applying SubBytes of Equation 2 to a row of 4 bytes. The overloaded multiplication instruction Formula 1 may already support arbitrary reduced polynomials.

Now an example of using overloaded instructions in SM4 may be presented. SubBytes of SM4 may be defined as follows.

$$b_i' \leftarrow (((b_i * 0xCB) \oplus 0xD3)^{-1} * 0xCB) \oplus 0xD3 \quad \text{[Formula 6]}$$

Here, 0x1F5 and 0x101 may be reduced polynomials for multiplicative inversion and convolution, respectively. Therefore, SubBytes for 4 bytes of the word selected in SM4 may be defined as ((((0x1F5/((r*A)^C))*A)^C). Here, A may be 0xCB101000 and C may be 0xD3D3D3D3. The inverse SubBytes of AES and SM4 may be similarly defined using multiplicative inversion. In other words, an overloaded division instruction may require the same multiplicative inversion logic circuit for encryption and decryption.

Figure 10:
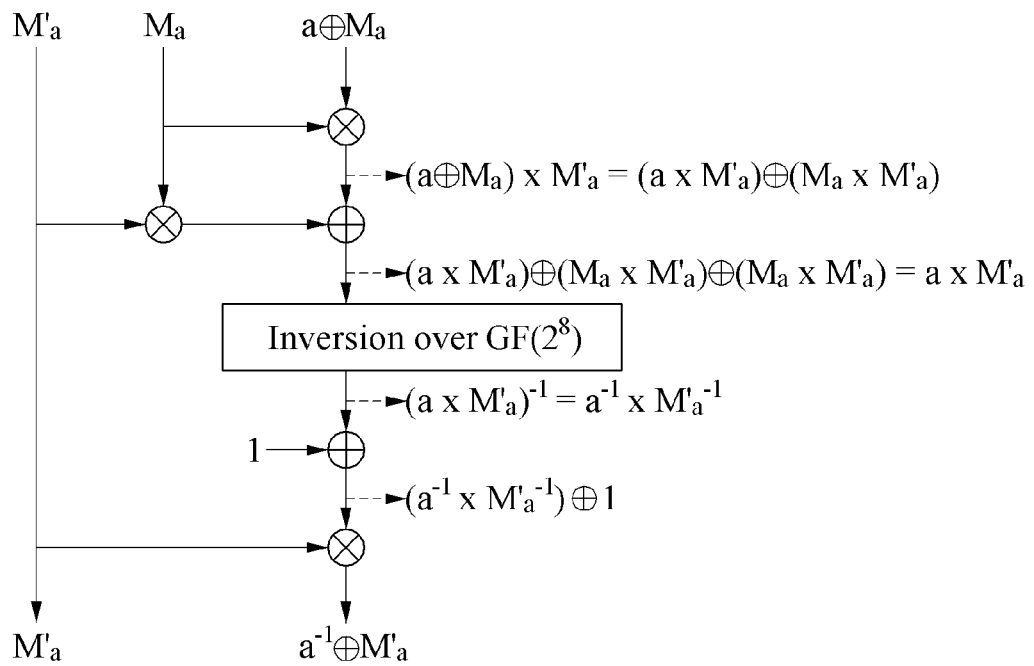
FIG. 10 is a diagram illustrating an example of inversion through masking according to an example embodiment.

FIG. 10 is a diagram illustrating an example of inversion through masking according to an example embodiment.

Instruction Overloading for Masking

The power analysis attack may be a technique for recovering a secret key by statistically analyzing a power consumption trace collected during a key-related cryptographic operation. The masking may be a measure to protect block ciphers from such attacks. This may be a secret sharing technique in which sensitive intermediate variables used in cryptographic operations are divided into shares using randomizers called masks.

In order to add hardware masking capability to the processor, the following four factors may be considered. Random number generator; buffers for mask values; extension of load and store units; extensions of ALUs, multipliers and dividers for masked operations.

First, the mask values may have to be set randomly to be resistant to the power analysis attack. A true random number generator (TRNG) is used, and a generated random number sequence may pass National Institute of Standards and Technology (NIST) random test suites. A 32-bit random number generated by four pairs of TRNGs and an 8-bit linear feedback shift register (LFSR) may be used as an initial mask value when a normal word is first stored in Text0-Text7 and when the current mask value is updated with a new value during the masked operation.

Second, in order to maintain the mask values, buffers called Mask-Buffers including TextMask0-TextMask7 and GprMask0-GprMask7 connected to Text0-Text7 and a0-a7, respectively, in GPR may be added. The mask values are stored in MaskBuffers, and by using these values, values of Text0-Text7 and a0-a7 may be XOR-masked.

Third, load and store instructions may be redefined to support transmission of the mask values. In other words, when transmitting a masked value between Text0-Text7 and a0-a7, the overloaded load and store instructions may transmit the mask between TextMask0-TextMask7 and GprMask0-GprMask7.

Finally, to support masked operations for AES, SM4, and SIMON, five operation executions may be modified: multiplicative inversion (/), AND (&), convolution (*), rotation (<<), and XOR (^).

The first modified instruction may be an overloaded division instruction, i.e. multiplicative inversion. A masking method is shown in FIG. 10. Here, $M_a$ is the mask value for the value a. Given an XOR mask value a⊕Ma, it may be transformed to a multiplication mask value a × $M_a'$ by multiplication and a new mask value $M_a'$. After the reciprocal is calculated, the result may be transformed to an XOR mask a−1⊕Ma' by further multiplication.

The second instruction to change may be AND. It is assumed that c=a & b is calculated. Here, & may represent a bitwise AND operation. Given that the two operands of the AND instruction are XOR-masked A=a⊕$M_a$ and B=b⊕$M_b'$, then C=(A&B)⊕($M_a$&B)⊕($M_b$&A) may be equal to c⊕M where Mc=$M_a$ & $M_b$. Masked AND is SIMON-only, but power analysis prevention SPECK may also be supported in the case that masking is applied to the addition. Finally, applying masking does not require changing the operations of ALUs and multipliers for XOR, convolution, and rotation. However, it may be necessary to apply the same operation to the mask value as the masked value. For example, if the masked value of GPR is rotated by 8 bits, the corresponding mask value in the Mask-Buffer may also need to be rotated by 8 bits.

Figure 11:
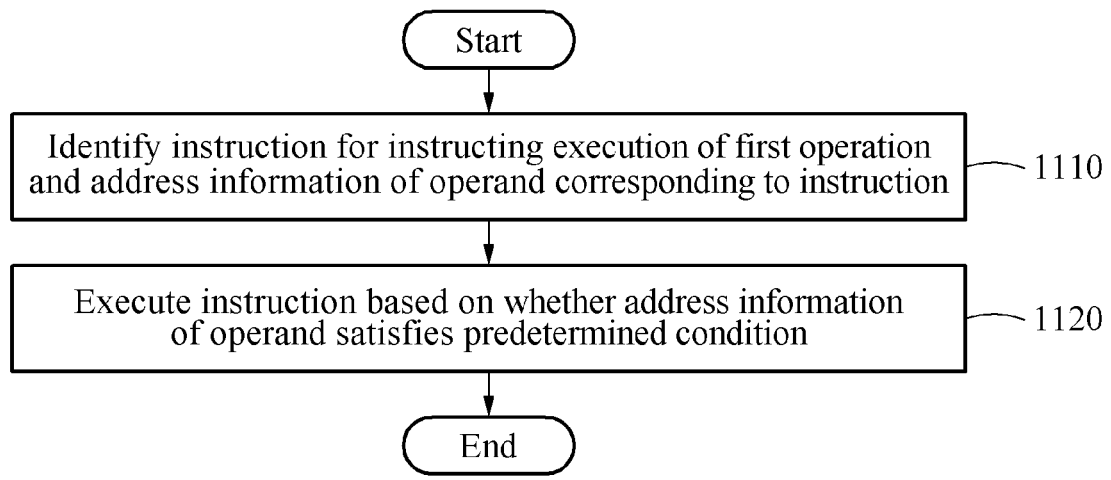
FIG. 11 is a diagram illustrating a method of operating a processor according to an example embodiment.

FIG. 11 is a diagram illustrating a method of operating a processor according to an example embodiment.

In operation 1110, the processor identifies an instruction for instructing execution of a first operation and address information of an operand corresponding to the instruction. For example, the operand may be loaded from a memory connected to the processor and stored in a dedicated buffer in the processor, and the address information of the operand may indicate an address in the dedicated buffer in which the operand is stored. If the address information of the operand satisfies a predetermined condition, the operand may be stored in the data-buffer in the processor, and the address information of the operand may be stored in the configuration-buffer in the processor. The configuration-buffer may be a memory mapped buffer.

In operation 1120, the processor executes the instruction based on whether the address information of the operand satisfies a predetermined condition. The processor executes a second operation set for the instruction on the operand if the address information of the operand satisfies the predetermined condition, and executes the first operation on the operand if the address information of the operand does not satisfy the predetermined condition.

For example, the predetermined condition may correspond to whether the address information of the operand falls within a preset address range. Here, the first operation may be an operation that is executed less than the second operation in the processor. The address range according to the predetermined condition may be pre-registered with the processor before the instruction is executed. The second operation may be an operation not included in the ISA of the processor.

Whether the address information of the operand satisfies the predetermined condition may be expressed by flag information connected to a general-purpose register in the processor. If the address information of the operand satisfies the predetermined condition, the round counter and the round-key pointer used in the operation of the processor may be stored in the data-buffer in the processor, and the address information of the round counter and the address information of the round-key pointer may be stored in the configuration-buffer in the processor.

The above descriptions with reference to FIGS. 1 to 10 are applied to each operation shown in FIG. 11, and thus further detailed description will be omitted.

The methods according to example embodiments may be embodied in the form of program instructions that may be executed through various computer means and recorded in a computer-readable medium. The computer-readable medium may include program instructions, data files, data structures, and the like, alone or in combination.

The program instructions recorded on the medium may be specially designed and configured for the example embodiments, or may be known and available to those skilled in the art of computer software. Examples of the computer-readable recording medium may include hardware devices specially configured to store and execute program instructions, such as magnetic media such as hard disks, floppy disks, and magnetic tapes, optical media such as CD-ROMs and DVDs, magneto-optical media such as floppy disks, ROM, RAM, and flash memory. Examples of program instructions include not only machine language codes such as those generated by a compiler, but also high-level language codes that may be executed by a computer using an interpreter or the like. The hardware device described above may be configured to operate as one or more software modules to perform the operations of the example embodiments, and vice versa.

Software may comprise a computer program, code, instructions, or a combination of one or more thereof, which may configure a processing device to operate as desired or independently or collectively instruct the processing device.

Software and/or data may be permanently or temporarily embodied in any type of machine, component, physical device, virtual equipment, computer storage medium or device, or transmitted signal wave to be interpreted by or to provide instructions or data to the processing device. Software may be distributed over networked computer systems and stored or executed in a distributed manner. Software and data may be stored in one or more computer-readable recording media.

As described above, although the example embodiments have been described with reference to the limited drawings, those skilled in the art may apply various technical modifications and variations based on the above. For example, even if the described techniques are performed in an order different from the described method, and/or the components of the described system, structure, apparatus, circuit, and the like are combined or connected in a form different from the described method, or replaced or substituted by other components or equivalents, appropriate results may be achieved.

Therefore, other implementations, other example embodiments, and equivalents to the claims are also within the scope of the following claims.

The invention claimed is:

1. A processor operation method comprising:
   identifying an instruction for instructing execution of a first operation and address information of an operand corresponding to the instruction; and
   executing the instruction based on whether or not the address information of the operand satisfies a predetermined condition,
   wherein the executing of the instruction comprises:
   executing a second operation set for the instruction on the operand if the address information of the operand satisfies the predetermined condition; and
   executing the first operation on the operand if the address information of the operand does not satisfy the predetermined condition,
   wherein if the address information of the operand satisfies the predetermined condition, a round counter and a round-key pointer used in an operation of the processor are stored in a data-buffer in the processor and address information of the round counter and address information of the round-key pointer are stored in a configuration-buffer in the processor.

2. The processor operation method of claim 1, wherein the predetermined condition corresponds to whether or not the address information of the operand falls within a preset address range.

3. The processor operation method of claim 1, wherein the first operation is an operation that is executed less than the second operation in the processor.

4. The processor operation method of claim 1, wherein an address range according to the predetermined condition is pre-registered with the processor before the instruction is executed.

5. The processor operation method of claim 1, wherein the second operation is an operation not included in an instruction set architecture (ISA) of the processor.

6. The processor operation method of claim 1, wherein the operand is loaded from a memory connected to the processor and stored in a dedicated buffer in the processor, and
   the address information of the operand indicates an address in the dedicated buffer in which the operand is stored.

7. The processor operation method of claim 1, wherein if the address information of the operand satisfies the predetermined condition, the operand is stored in a data-buffer in the processor and the address information of the operand is stored in a configuration-buffer in the processor.

8. The processor operation method of claim 7, wherein the configuration-buffer is a memory mapped buffer.

9. The processor operation method of claim 1, wherein whether or not the address information of the operand satisfies the predetermined condition is expressed by flag information connected to a general-purpose register in the processor.

10. A processor comprising:
    a data-buffer configured to store an operand;
    a configuration-buffer configured to store address information of the operand; and
    a processing unit configured to identify an instruction for instructing execution of a first operation and address information of the operand corresponding to the instruction, and execute the instruction based on whether or not the address information of the operand satisfies a predetermined condition,
    wherein the processing unit is configured to:
    execute a second operation set for the instruction on the operand if the address information of the operand satisfies the predetermined condition; execute the first operation on the operand if the address information of the operand does not satisfy the predetermined condition,
    store a round counter and a round-key pointer which are used in an operation of the processor in a data-buffer in the processor and,
    store address information of the round counter and address information of the round-key pointer in a configuration-buffer in the processor.

11. The processor of claim 10, wherein the predetermined condition corresponds to whether or not the address information of the operand falls within a preset address range.

12. The processor of claim 10, wherein the first operation is an operation that is executed less than the second operation in the processor.

13. The processor of claim 10, wherein an address range according to the predetermined condition is pre-registered with the processor before the instruction is executed.

14. The processor of claim 10, wherein the second operation is an operation not included in an instruction set architecture (ISA) of the processor.

15. The processor of claim 10, wherein the operand is loaded from a memory connected to the processor and stored in a dedicated buffer in the processor, and the address information of the operand indicates an address in the dedicated buffer in which the operand is stored.

16. The processor of claim 10, wherein if the address information of the operand satisfies the predetermined condition, the operand is stored in a data-buffer in the processor and the address information of the operand is stored in a configuration-buffer in the processor.

17. The processor of claim 10, further comprising:
a dedicated operator configured to perform the second operation.

18. An electronic device comprising:
a memory configured to store an instruction and an operand corresponding to the instruction; and
a processor configured to execute the instruction,
wherein the processor comprises:
a buffer configured to store the operand and address information of the operand received from the memory to execute the instruction; and
a processing unit configured to identify the instruction for instructing execution of a first operation and the address information of the operand corresponding to the instruction, and execute the instruction based on whether or not the address information of the operand satisfies a predetermined condition, and
the processing unit is configured to:
execute a second operation set for the instruction on the operand if the address information of the operand satisfies the predetermined condition; and
execute the first operation on the operand if the address information of the operand does not satisfy the predetermined condition;
store a round counter and a round-key pointer which are used in an operation of the processor in a data-buffer in the processor and,
store address information of the round counter and address information of the round-key pointer in a configuration-buffer in the processor.

* * * * *